US008800913B2

(12) United States Patent
Pagliara et al.

(10) Patent No.: US 8,800,913 B2
(45) Date of Patent: Aug. 12, 2014

(54) METHODS AND APPARATUS FOR A TANDEM DIVERT AND ATTITUDE CONTROL SYSTEM

(75) Inventors: Philip W. Pagliara, Tucson, AZ (US);
Michael A. Leal, Tucson, AZ (US);
Justin C. Jenia, Tucson, AZ (US);
Teryn Dalbello, Green Valley, AZ (US);
John M. Hitner, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 1215 days.

(21) Appl. No.: 12/696,395

(22) Filed: Jan. 29, 2010

(65) Prior Publication Data

US 2011/0029160 A1 Feb. 3, 2011

Related U.S. Application Data

(60) Provisional application No. 61/229,899, filed on Jul. 30, 2009.

(51) Int. Cl.
| B64C 15/00 | (2006.01) |
| B64B 1/36 | (2006.01) |
| B64C 9/38 | (2006.01) |
| B64C 23/00 | (2006.01) |
| B64C 15/02 | (2006.01) |

(52) U.S. Cl.
CPC ............. *B64C 9/38* (2013.01); *B64C 23/005* (2013.01); *B64C 2700/6271* (2013.01); *B64C 15/02* (2013.01); *B64C 2700/625* (2013.01)
USPC .......................................... 244/52

(58) Field of Classification Search
CPC .. B64C 9/38; B64C 2700/625; B64C 23/005; B64C 2700/6271; B64C 15/02
USPC .................. 244/52, 3.1, 3.11, 3.22, 3.15, 169
See application file for complete search history.

(56) References Cited

U.S. PATENT DOCUMENTS

| 4,711,414 | A | 12/1987 | Dunn |
| 7,350,744 | B1* | 4/2008 | Schwartz et al. ............ 244/3.15 |
| 2002/0153448 | A1 | 10/2002 | Mayersak |
| 2008/0099627 | A1 | 5/2008 | Eidelman |
| 2011/0204177 | A1* | 8/2011 | Ritchie et al. .................. 244/3.1 |

FOREIGN PATENT DOCUMENTS

| FR | 2686687 A1 | 7/1993 |
| GB | 2251834 A | 7/1992 |

OTHER PUBLICATIONS

European Patent Office, International Searching Authority, "International Search Report," mailed Jun. 21, 2010; International Application No. PCT/US2010/028162 filed Mar. 22, 2010.

* cited by examiner

*Primary Examiner* — Valentina Xavier
(74) *Attorney, Agent, or Firm* — Eric A. Gifford

(57) ABSTRACT

An aeronautical vehicle includes at least one set of tandem divert thrusters incorporated into the body. Each set of tandem divert thrusters includes a first divert thruster and a second divert thruster, each configured to provide substantially equal thrust forces at substantially the same time and in substantially opposite directions such that the moment reference point lies between the first and second divert thrusters.

15 Claims, 3 Drawing Sheets

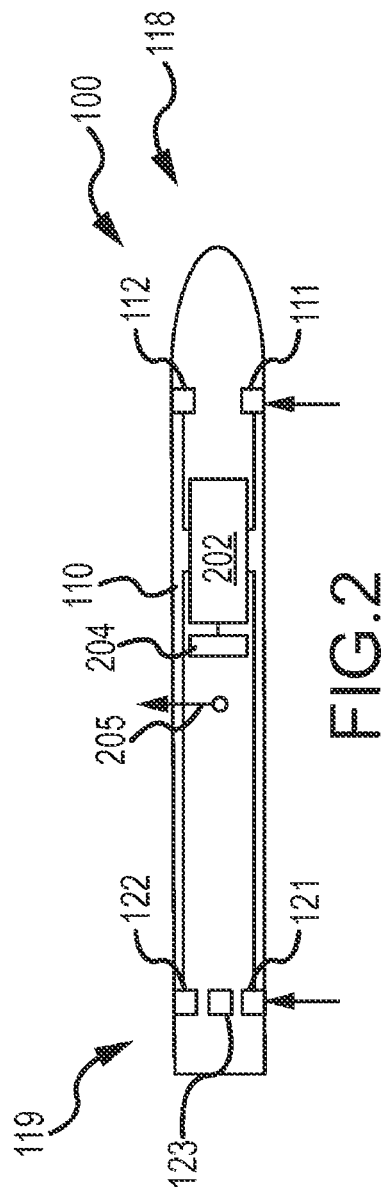
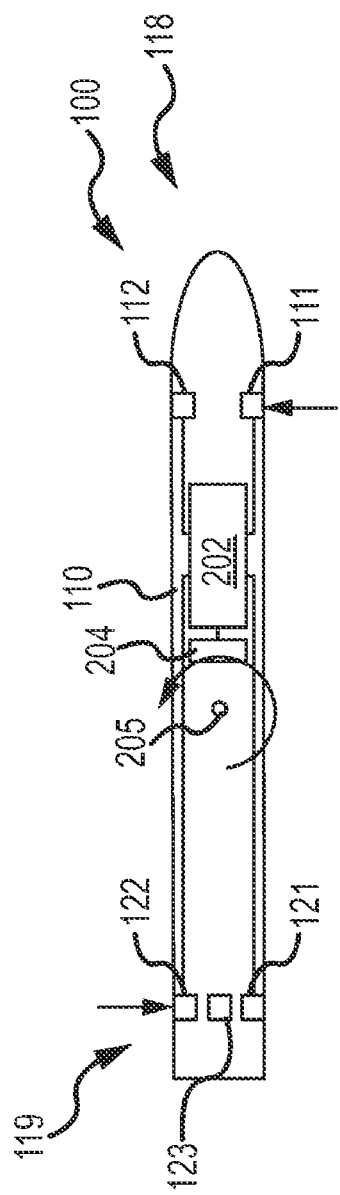

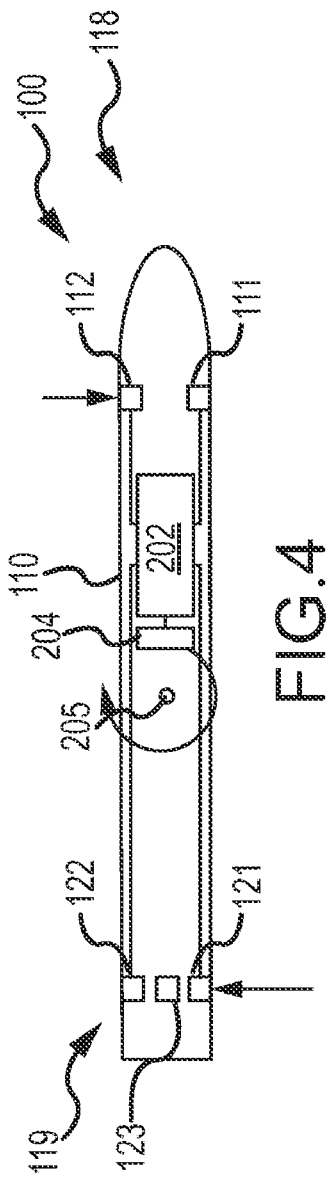
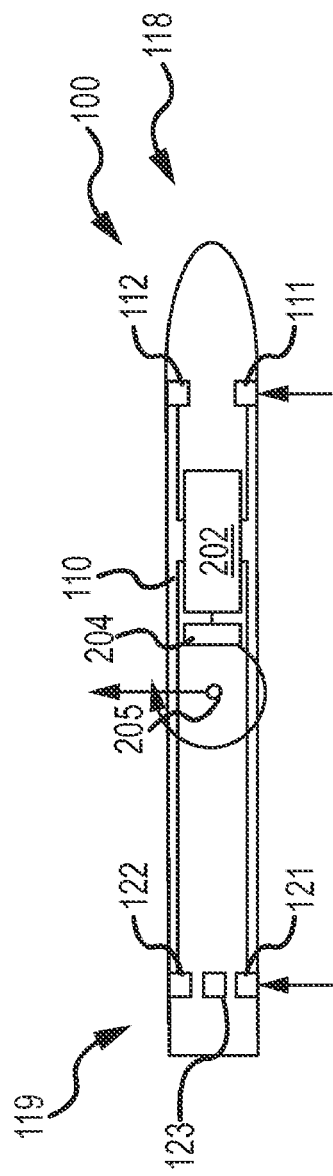

METHODS AND APPARATUS FOR A TANDEM DIVERT AND ATTITUDE CONTROL SYSTEM

CROSS-REFERENCE

The present application claims priority to U.S. Prov. Pat. Ser. No. 61/229,899, filed Jul. 30, 2009, which is hereby incorporated by reference.

TECHNICAL FIELD

The present invention generally relates to the control of missiles, kill vehicles, and other aeronautical vehicles, and more particularly relates to divert and attitude control systems (DACS) used in connection with such vehicles.

BACKGROUND

Ballistic missile threats and reentry vehicles continue to proliferate and evolve technically. Several anti ballistic missile (ABM) defense systems have been developed, however, which are capable of intercepting such missiles with precise hit-to-kill technologies. Nevertheless, currently known kill vehicles of this type tend to exhibit limited agility (i.e., high-g capability) and are not always capable of operating effectively in the high endo-atmosphere.

More particularly, conventional kill vehicles typically include a seeker assembly, a guidance electronics section, a divert and attitude and control system (DACS), power sources, and a communication system, all of which are enclosed within a structure and aero shell. As these subsystems continue to advance and acquire additional capabilities, the mass of the overall kill vehicle tends to increase, reducing its agility.

Furthermore, conventional DACS employ only a single divert thruster arrangement and a separate attitude control system, both of which are limiting factors given the typically constrained packaging envelope for thruster assemblies and associated attitude control system.

Accordingly, it is desirable to provide improved systems and methods for controlling aeronautical vehicles, such as kill vehicles and the like. Other desirable features and characteristics of the present invention will become apparent from the subsequent detailed description and the appended claims, taken in conjunction with the accompanying drawings and the foregoing technical field and background.

BRIEF SUMMARY

A divert and attitude control system for an aeronautical vehicle generally includes a first thruster configured to produce a first force on the aeronautical vehicle proximate a first end of the aeronautical vehicle within a first plane, wherein the first force is substantially perpendicular to the major axis of the aeronautical vehicle, and wherein the major axis lies within the plane; and a second thruster configured to produce a second force on the aeronautical vehicle proximate a second end of the aeronautical vehicle and within the first plane, wherein the second force is perpendicular to the major axis of the aeronautical vehicle in a direction opposite that of the first force; wherein the first force is substantially the same as the second force, and wherein the first thruster and second thruster are configured to produce the first and second forces substantially simultaneously.

A method in accordance with one embodiment includes receiving a command associated with a required attitude adjustment within a first plane intersecting a major axis of the aeronautical vehicle; generating a first thrust force from the aeronautical vehicle proximate a first end of the aeronautical vehicle within the first plane, wherein the first thrust force has an orientation substantially perpendicular to the major axis of the aeronautical vehicle; and generating a second thrust force from the aeronautical vehicle proximate a second end of the aeronautical vehicle within the first plane; wherein the first thrust force has an orientation substantially opposite that of the first thrust force (i.e., rotated by 180°); wherein the first and second thrust forces are substantially equal and are generated substantially simultaneously.

An aeronautical vehicle in accordance with one embodiment includes a body having a moment reference point lying along a longitudinal axis; and at least one set of tandem divert thrusters incorporated into the body; wherein each set of tandem divert thrusters includes a first divert thruster and a second divert thruster, each configured to provide substantially equal thrust forces at substantially the same time and in substantially opposite directions, and wherein the moment reference point lies between the first and second divert thrusters.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 2 is a schematic overview of a DACS in accordance with one embodiment;

FIG. 3 depicts operation and resultant rotation of the DACS shown in FIG. 2;

FIG. 4 depicts operation and resultant rotation of the DACS shown in FIG. 2; and FIG. 5 depicts attitude and orientation adjustment of the DACS shown in FIG. 2.

DETAILED DESCRIPTION

Figure 1:
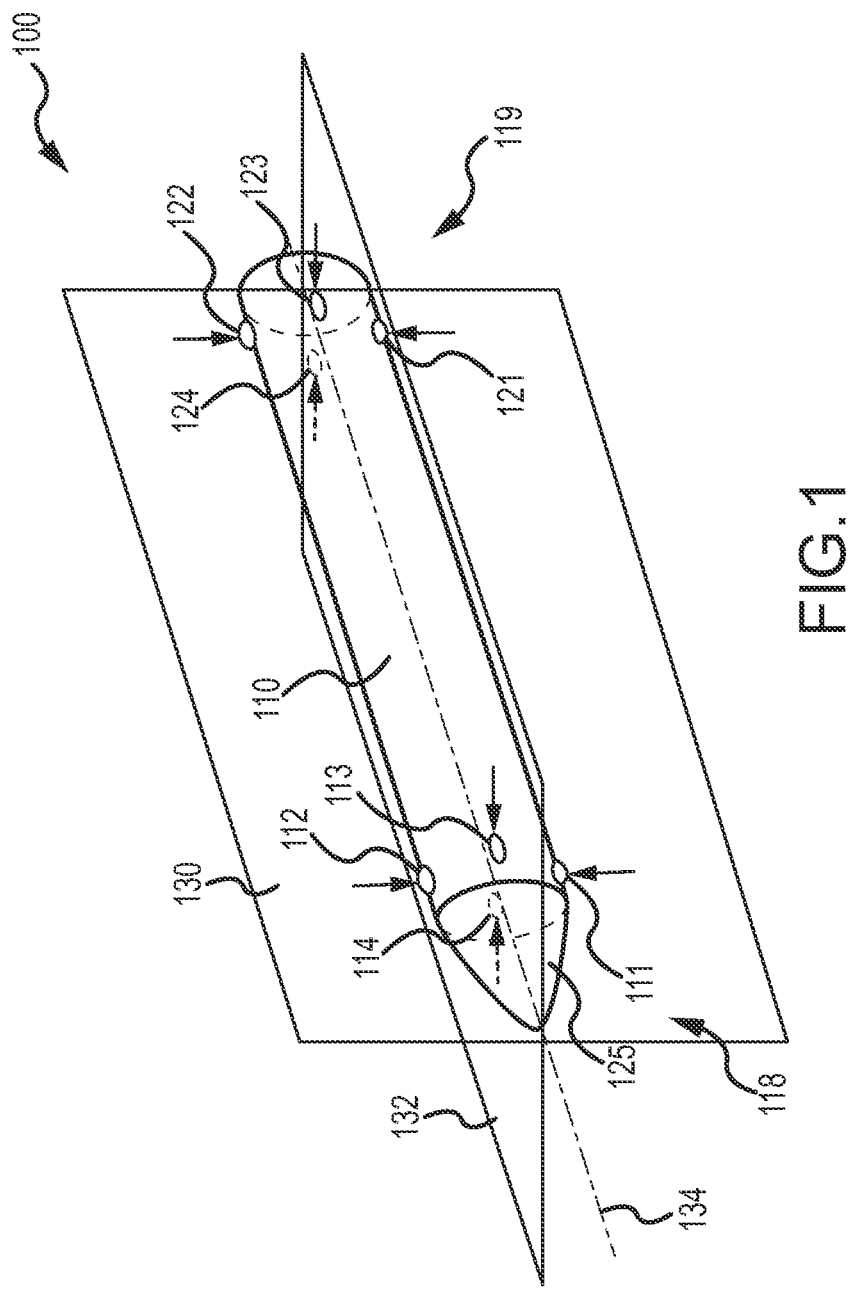
FIG. 1. illustrates an aeronautical vehicle and DACS in accordance with one embodiment.

The following discussion generally relates to improved methods and apparatus for removing connectors from circuit card assemblies. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description.

In general, a tandem divert solution in accordance with various embodiments employs multiple (e.g., tandem) divert thrusters oriented in opposite directions within each plane of the vehicle, thereby doubling the effective thrust available to effect attitude control.

FIG. 1, which is not necessarily drawn to scale, depicts a simplified, external overview of a aeronautical vehicle 100 in accordance with one embodiment. As shown, aeronautical vehicle 100 includes a body 110 having a first end 118 (e.g., the "front end" close to a nose cover 124) and a second end 119 (e.g., the "back end") oriented along a major (or longitudinal) axis 134. One or more divert-attitude-control jets (or simply "thrusters") 111-114 and 121-124 are provided on, within, or otherwise mechanically coupled to body no such that one set of thrusters (111-114) is proximate to end 118, and the other set of thrusters (121-124) is proximate to the opposite end, i.e., end 119. The arrows therefore illustrate the forces on body 110 resulting from respective thrusters.

In accordance with one embodiment, the thrusters are configured in pairs, or in "tandem," such that together they may produce opposite but substantially equal thrusts, thereby producing a moment within one or more rotational planes, e.g., orthogonal planes 130 and 132. In addition, as illustrated in the figures, a divert operation may be accompanied by a change of altitude by proper application of thrust forces. Further in accordance with this embodiment, the thrusters within a given set of thrusters are located at equal distances along major axis 134. As a result, the forces produced by thrusters on opposite sides of body 110 within each set are substantially collinear (e.g., forces produced by thrusters 112 and 111).

Thruster 112, when activated, is configured to produce a force having an amplitude that is predetermined based on the desired attitude change, and a direction that is substantially perpendicular to the major axis 134 within plane 130 (e.g., normal to the cylindrical surface of body 110). Similarly, thruster 121 is configured to produce a force (simultaneously with activation of thruster 112) that is substantially equal to that of thruster 112 within plane 130 but acts in the opposite direction (e.g., a delta of 180 degrees within plane 130). Thrusters 121 and 112 are therefore said to operate in "tandem."

Similarly, thrusters in and 122 operate in tandem to provide rotation in the opposite direction within plane 130, as illustrated. In this way, four thrusters 111, 112, 121, and 122 can be used to provide rotational control within plane 130, and thrusters 113, 114, 123, and 124 can be used to provide rotational control within plane 132.

The placement and number of thrusters illustrated in FIG. 1 is not intended to be limiting in any way, and are merely drawn in a manner that assists in describing the invention. Furthermore, additional thrusters in each plane may be provided in order to allow other forms of control, such as thrusters aligned with major axis 134 (e.g., axial thruster 123).

Thrusters 111-114 and 121-124 may comprise any suitable thruster component or components known in the art. In one embodiment, for example, these thrusters are divert attitude control jets having conical nozzles of the same size and shape. The size of the jets may be optimized depending upon the application, and based on known principles.

Referring now to the conceptual side views illustrated in FIGS. 2-4, the body 110 generally encloses a gas source (or other type of fuel source) 202, as well as a controller 204 communicatively coupled to gas source 202 and thrusters 111, 112, 121, 122.

Controller 204, which may include any combination of hardware, software, and/or firmware, is configured to control the thrust produced by the thrusters in response to, for example, a torque command from a guidance system or other subsystem. In this regard, those skilled in the art will recognize that any number of additional, conventional electrical and mechanical components, such as valves, actuators, solenoids, power electronics, have been left out of these figures for the purposes of clarity. Furthermore, in the context of kill vehicles and the like, additional modules will typically be housed within body 110, such as seeker assemblies, guidance electronics, batteries, and communication modules.

As shown in FIG. 3, when thrusters 111 and 122 are simultaneously activated via controller 204, utilizing gas source 202, body 110 experiences a moment within the plane (plane 130 of FIG. 1) about a moment reference point ("MRP") 205, which will generally, but not necessarily, be located coincident with the center of body 110. Similarly, as shown in FIG. 4, activation of thrusters 121 and 112 will produce a substantially equal, but opposite moment about MRP 205.

Moreover, as depicted in FIG. 5, simultaneous divert and attitude control may be accomplished by application of forces of appropriate magnitudes and directions. These forces may be applied normal to each other or within a particular plane to accomplish the desired behavior of DACS 100.

Conventional divert systems utilize much lower force attitude control thrusters, typically on the order of $\frac{1}{10}$ or less the force of a divert thruster. As the magnitude of the moment around point 205 is equal to the product of the thrust force and the distance of the force from that point, embodiments in accordance with the present invention can therefore provide larger moments, allowing a greater degree of yaw within each plane. The primary benefits of the resulting embodiments are, for example, increased agility for a given vehicle diameter, and very large moments capable of overcoming aero torques when operating in the atmosphere.

In accordance with one embodiment, a single common gas source 202 is provided for all thrusters. This allows the propulsion system's complexity and mass to be reduced by eliminating the need for multiple rocket motors, plumbing, valves, attitude control systems, and the like. Suitable common gas sources include, for example, any of the various throttleable solid propellant gas sources known in the art.

In an embodiment incorporating a single common gas generator, axial thruster 123 can be incorporated into the same end as one or more of the tandem thrusters, providing greater operational flexibility.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A divert and attitude control system for an aeronautical kill vehicle having a moment reference point lying along a longitudinal axis, comprising:

a first thruster configured to produce a first force on the aeronautical kill vehicle proximate a first end of the aeronautical vehicle and substantially perpendicular to the longitudinal axis within a first plane;

a second thruster configured to produce a second force on the aeronautical kill vehicle proximate a second end of the aeronautical kill vehicle opposite the first end and substantially perpendicular to the longitudinal axis within the first plane in a direction opposite that of the first force, and wherein the moment reference point lies between the first and second thrusters;

a third thruster configured proximate the first end of aeronautical vehicle to produce a third force in the first plane substantially collinear with the first force in the opposite direction;

a fourth thruster configured proximate the second end of the aeronautical vehicle to produce a fourth force in the first plane substantially collinear with the second force, and wherein the moment reference point lies between the third and fourth divert thrusters;

wherein said first, second, third and fourth thrusters are each at a fixed and non-rotating position in the first plane, wherein said first, second, third and fourth thrusters produce first, second, third and fourth forces that are co-planar in the first plane and perpendicular to the longitudinal axis in the first plane, and a common gas source communicating with each of the first, second, third, and fourth thrusters, said common gas source comprising a gas generator with solid propellant grain; and a controller communicatively coupled to the common gas source and the thrusters to control the forces produced by the first, second, third and fourth thrusters to perform both divert and attitude control maneuvers only in the first plane.

2. The control system of claim 1, wherein each and every said thruster in the control system is configured to produce a force in said first plane or a different plane in which the longitudinal axis lies, each said force being perpendicular or co-axial with said longitudinal axis.

3. The control system of claim 1, further including:
a fifth thruster configured to produce a fifth force on the aeronautical kill vehicle proximate the first end of the aeronautical kill vehicle and within a second plane orthogonal to the first plane, wherein the longitudinal axis lies in the second plane, wherein the fifth force is substantially perpendicular to the longitudinal axis of the aeronautical kill vehicle;

a sixth thruster configured to produce a sixth force on the aeronautical kill vehicle proximate the second end of the aeronautical kill vehicle and within the second plane, wherein the moment reference point lies between the fifth and sixth thrusters;

a seventh thruster configured to produce a seventh force in the second plane substantially collinear with the fifth force in the opposite direction, and an eighth thruster configured to produce an eighth force in the second plane substantially collinear with the sixth force, wherein the moment reference point lies between the fifth and sixth thrusters;

said controller communicatively coupled to the common gas source and the thrusters to control the forces produced by the fifth, sixth, seventh and eighth to perform both divert and attitude control maneuvers only in the second plane.

4. The control system of claim 3, further including a ninth thruster aligned coaxially with the longitudinal axis.

5. The control system of claim 3, wherein the controller is configured to provide thrust signals to the first, second, third, fourth, fifth, sixth, seventh, and eighth thrusters to produce paired thrust forces to either substantially only divert the kill vehicle in said first or second planes or substantially only rotate the kill vehicle in said first or second planes.

6. A method of adjusting the attitude of an aeronautical kill vehicle having a moment reference point lying along a longitudinal axis, comprising:

receiving a command associated with a required attitude adjustment within a first plane intersecting the longitudinal axis of the aeronautical kill vehicle;

generating a first thrust force from a fixed and non-rotating position on the aeronautical vehicle proximate a first end of the aeronautical kill vehicle within the first plane, wherein the first thrust force has an orientation substantially perpendicular to the longitudinal axis of the aeronautical kill vehicle;

generating a second thrust force from a fixed and non-rotating position on the aeronautical kill vehicle proximate a second end of the aeronautical kill vehicle opposite the first end within the first plane, wherein the second thrust force has an orientation substantially opposite that of the first thrust force;

wherein the first and second thrust forces are substantially equal and are generated substantially simultaneously on opposite sides of the moment reference point to produce only the required attitude adjustment in the first plane;

receiving a command associated with a required divert adjustment within the first plane;

generating a third thrust force from a fixed and non-rotating position on the aeronautical kill vehicle proximate the first end of the aeronautical kill vehicle within the first plane, wherein the third thrust force has an orientation substantially perpendicular to the longitudinal axis of the aeronautical kill vehicle; and generating a fourth thrust force from a fixed and non-rotating position on the aeronautical kill vehicle proximate the second end of the aeronautical kill vehicle opposite the first end within the first plane, wherein the first thrust force has an orientation substantially the same as that of the third thrust force;

wherein the third and fourth thrust forces are substantially equal and are generated substantially simultaneously on opposite sides of the moment reference point to produce only the required divert adjustment in the first plane.

7. The method of claim 6, further including generating the first and second thrust forces from a common gas source.

8. The method of claim 6, further including applying an axial thrust force along the longitudinal axis of the aeronautical kill vehicle.

9. An aeronautical kill vehicle comprising:
a body having a moment reference point lying along a longitudinal axis; and at least four sets of tandem divert thrusters incorporated into the body;

wherein each set of tandem divert thrusters includes a first divert thruster and a second divert thruster positioned at opposite ends of the kill vehicle to either side of the moment reference point, each said thruster configured to provide substantially equal thrust forces in substantially opposite and fixed directions perpendicular to the longitudinal axis, wherein the first and second sets effecting rotation only in a first plane, and the third and fourth sets effecting rotation only in a second plane orthogonal to the second plane, wherein the first and second planes intersect along the longitudinal axis of the body, wherein the first and second thrusters in said first and second sets are each at a fixed and non-rotating position in the first plane orthogonal to the longitudinal axis, wherein the first and second thrusters in said third and fourth sets are each at a fixed and non-rotating position in the second plane orthogonal to the longitudinal axis; and a controller configured to provide paired thrust signals to produce paired thrust forces to substantially only divert the kill vehicle in said first or second planes or to substantially only rotate the kill vehicle in said first or second planes.

10. The aeronautical kill vehicle of claim 9, wherein each and every said thruster in the control system is configured to produce a force in the first or second planes or a different plane in which the longitudinal axis lies, each said force being perpendicular or co-axial with said longitudinal axis.

11. The aeronautical kill vehicle of claim 9, further including at least one axial thruster having an orientation aligned with the longitudinal axis of the aeronautical vehicle.

12. The aeronautical kill vehicle of claim 9, further including a common gas source in fluid communication with each of the sets of tandem divert thrusters.

13. The aeronautical kill vehicle of claim 12, wherein the common gas source comprises a gas generator with solid propellant grain.

14. The control system of claim 1, wherein each said thruster comprises a throttleable nozzle.

15. The control system of claim 1, wherein said controller is configured to control the forces produced by the first and second thrusters or the third and fourth thrusters to provide substantially only an attitude adjustment in the first plane and is configured to control the forces produced by first and fourth thrusters or the second and third thrusters to provide substantially only a divert adjustment in the first plane.

\* \* \* \* \*